(12) United States Patent
Eberling

(10) Patent No.: US 6,308,793 B1
(45) Date of Patent: Oct. 30, 2001

(54) PROPORTIONAL LOAD TRANSFER VALVE FOR SUSPENSION CONTROL WITH 6×2 AUTOMATIC TRACTION CONTROL

(75) Inventor: Charles E. Eberling, Wellington, OH (US)

(73) Assignee: AlliedSignal Truck Brake Systems Co., Elyrio, OH (US)

( * ) Notice: Subject to any disclaimer, the term of this patent is extended or adjusted under 35 U.S.C. 154(b) by 0 days.

(21) Appl. No.: 09/285,172

(22) Filed: Mar. 22, 1999

(51) Int. Cl.[7] .......................... B60G 11/27; B60G 17/056
(52) U.S. Cl. ................... 180/24.02; 280/124.16; 137/625.66
(58) Field of Search ................. 180/24.02, 209; 280/5.504, 86.5, 124.16, 683; 137/625.66

(56) References Cited

U.S. PATENT DOCUMENTS

| | | | |
|---|---|---|---|
| 4,141,430 | * 2/1979 | Eddy, Jr. | 180/24.02 |
| 4,944,526 | * 7/1990 | Eberling | 180/24.02 |
| 4,993,729 | 2/1991 | Payne . | |
| 5,845,723 | * 12/1998 | Hirahara et al. | 180/24.02 |

OTHER PUBLICATIONS

U.S. application Ser. No. 09/107,620, filed Jun. 30, 1998.

* cited by examiner

Primary Examiner—Peter C. English

(57) ABSTRACT

A proportional load transfer valve is disclosed to shift a predetermined ratio of approximately fifty percent (50%) of the weight on a tag axle to the drive axle. The load transfer valve acts in response to a pneumatic signal indicative of a traction event. The valve alters the ratio of supply port pressure associated with the air suspension bags of the drive axle that is forwarded to the delivery port associated with the air bag suspension assembly of the tag axle. As the weight imposed on the drive axle approaches a predetermined maximum, the load transfer valve transfers less weight so that the drive axle is not overloaded.

8 Claims, 5 Drawing Sheets

PROPORTIONAL LOAD TRANSFER VALVE FOR SUSPENSION CONTROL WITH 6×2 AUTOMATIC TRACTION CONTROL

CROSS-REFERENCE TO RELATED APPLICATION

Commonly assigned, copending application Ser. No. 09/107,620, filed Jun. 30, 1998, is related to an improved traction and suspension control assembly of the type that can use the proportion and control valve of the subject invention. The disclosure of that application is hereby incorporated by reference.

BACKGROUND OF THE INVENTION

1. Field of Invention

This invention pertains to a proportion and control valve for a suspension assembly associated with an air braking system for a tractor/trailer vehicle. The invention is particularly applicable to vehicles such as trucks/tractor systems known as a 6×2 vehicle employing a traction control system with air suspension control transfer. It will be appreciated, however, that the invention may have broader applications and may be advantageously employed in related environments or applications.

2. Description of Related Art

By way of brief background, a 6×4 truck and tractor system employs a pair of drive axles. As will be appreciated, the vehicle cost associated with a pair of drive axles is substantially greater than a 6×2 arrangement, i.e., a system in which only one of the two rear axles is a drive axle, because of the additional drive components. Since a 6×4 system has increased weight, operating costs, complexity, maintenance costs, friction, and fuel consumption associated therewith, a 6×2 assembly is highly desirable. On the other hand, a 6×2 system has decreased traction capabilities relative to a 6×4 configuration. Accordingly, a 6×2 system using an air suspension control to transfer load to the drive axle has been proposed as a preferred arrangement that achieves enhanced traction control.

Generally, traction control systems employ similar principles to antilock braking systems on wet or slippery surfaces, curves, split surfaces, ice, and the like, traction control assemblies sense when the wheels of a vehicle spin upon acceleration. This is representative of a loss of traction between the road surface and the tire. In response, drive torque is transferred to the non-spinning tires or wheels and a braking force is gently applied to the spinning wheel. This transfers the torque through the differential to the non-spinning, or more slowly spinning wheel. If both wheels spin, then the engine RPM is electronically controlled and reduced to an appropriate level.

As briefly indicated above, it has been proposed to use a shift or transfer the vehicle load in a 6×2 arrangement. An air bag suspension assembly associated therewith reduces the suspension bag pressure in the non-drive axle so that more weight is transferred to the drive axle. In this manner, an increased portion of the load is transferred to the drive axle to enhance traction.

Transferring all of the load to the drive axle can overload the drive axle in the laden mode. Moreover, transferring all of the load to the drive axle can bring into consideration axle warranty concerns and legal highway weight limits. Thus, a need exists for a proportional transfer of the load between the drive and non-drive axles in response to traction control events.

SUMMARY OF THE INVENTION

The present invention contemplates a new and improved proportional load transfer valve used in association with a traction and suspension assembly that overcomes the noted problems and provides a simple, economical assembly and process for achieving these goals.

According to the present invention, a proportional load transfer valve shifts weight from the tag axle to the drive axle in response to a signal from the traction control assembly during a traction event.

According to another aspect of the invention, as the weight of the drive axle approaches a predetermined limit, the load transfer valve decreases the weight transfer to the drive axle and reaches a maximum where no additional load should be transferred to prevent overloading of the drive axle.

According to another aspect of the invention, approximately fifty percent (50%) of the weight on the tag axle is transferred to the drive axle in response to a pneumatic signal from the traction control solenoid.

A principal advantage of the invention is the ability to control the load transfer of the weight from the tag axle to the drive axle for enhanced traction control.

Another advantage of the invention resides in the automated operation of the transfer that is responsive to a traction event.

Still another advantage of the invention is found in the ability to limit the proportional load transfer.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in the specification and illustrated in the accompanying drawings. The drawings include.

DETAILED DESCRIPTION OF THE PREFERRED EMBODIMENTS

Figure 1:
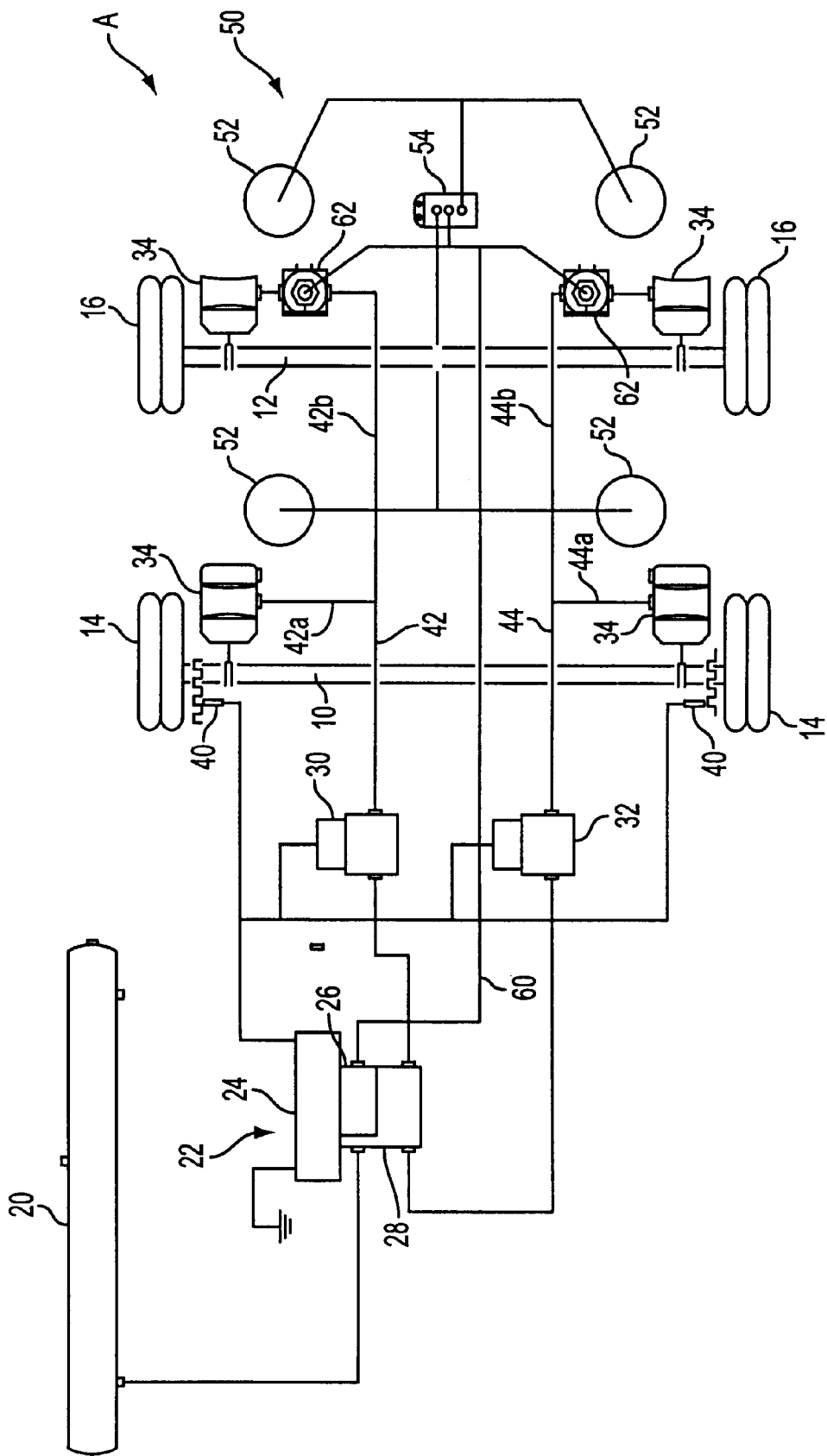
FIG. 1 which is a schematic representation of a 6×2 traction control system with an air suspension assembly that transfers load between the drive and tag axles.

Referring now to the drawings which illustrate the preferred embodiments of the invention only and are not intended to limit the invention, the FIGURES show a traction and suspension control assembly A used in a tractor/trailer vehicle. More particularly, FIG. 1 schematically illustrates a first or drive axle 10 and a second or non-drive axle 12 such as associated with a tractor cab (not shown). Mounted on opposite ends of the axles are rear wheels 14, 16, respectively, that support the weight imposed on the tractor when it pulls a loaded trailer, or in an unloaded condition known as a bobtail mode. In this 6×2 system, only one of the axles is driven and the second or rear axle, known as a tag axle, aids in supporting the weight from the trailer.

The illustrated traction and suspension control system shown in FIG. 1 is equipped with a conventional antilock/traction control assembly commercially available, for example, from the assignee of the present application. The antilock/traction control system includes a source of compressed air represented by cylinder 20. As is well-known in the art, a compressor periodically charges the cylinder so that a sufficient air supply or reservoir is provided for braking needs. The pressurized air is supplied to an antilock/traction controller 22 which includes an antilock electronic control unit 24 and a traction solenoid valve 26 and relay valve 28. The controller regulates air to modulator valves 30, 32 which supply air brake actuators 34 associated with the rear wheels 14, 16.

Sensors 40 are associated with the wheels 14 on the drive axle 10 to monitor the rotation of the wheels. The sensors provide representative signals of wheel spinning conditions to the control unit. If a wheel is spinning, i.e., a differential traction control event is sensed, braking is gently applied to the spinning wheel. Likewise, if all of the drive wheels are slipping, the RPM of the engine can be reduced and braking gently applied to the wheels. This transfers torque to the wheel(s) in a manner well-known with conventional traction control assemblies. Fluid lines 42, 44 extend from the modulators 30, 32, respectively to supply the brake actuators associated with the drive axle through first branch passages 42a, 44a. Likewise, second branch passages 42b, 44b communicate air to the brake actuators associated with the non-drive wheels 16.

An air bag suspension assembly 50 is also schematically represented in FIG. 1. It includes air bags 52 disposed in pairs adjacent the wheels of the first and second axles. By selectively increasing or decreasing the air bags, the vehicle load or weight can be shifted between the drive and non-drive axles. As will be appreciated, the air bags associated with one of the axles work in tandem to shift the vehicle load as desired for enhanced traction.

A line 60 extends from the traction solenoid to the air suspension control valve 54. In addition, isolation valves 62 are associated with the brake actuators of the non-drive axle. Thus, if a traction control event occurs, air pressure from the antilock/traction controller is directed to valves 62 to isolate the braking to the non-drive axle from the drive axle. This limits brake drag on the non-drive axle during a traction event.

Figure 2:
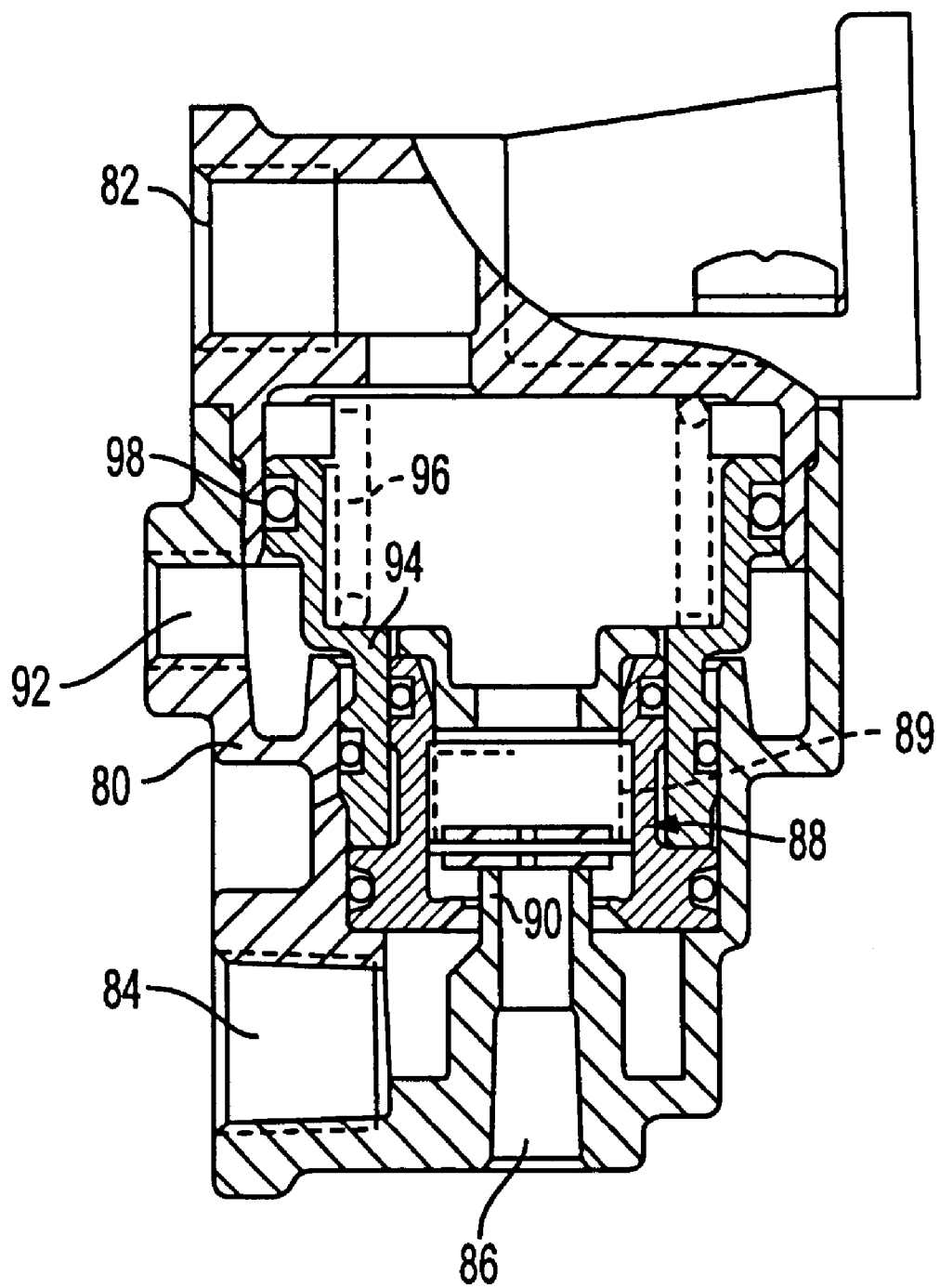
FIG. 2 is a longitudinal cross-section of a preferred proportional load transfer valve.

Particular structural details of a preferred proportional load transfer valve are shown in FIG. 2. A valve housing 80 includes a first or supply port 82 that communicates with the suspension assembly associated with the drive axle. In the valve position shown in FIG. 2, the supply port is in communication with a second or delivery port 84 that communicates with the tag axle suspension airbags. In addition, communication with a third or exhaust port 86 is precluded as a result of the biased inlet/exhaust valve 88 urged by spring 89. The inlet/exhaust valve is shown in a closed position with exhaust seat 90, although it will be understood that the valve 88 is selectively moved from the seat in response to pressure changes in the load transfer valve. A fourth or control port 92 receives a pneumatic signal from a traction control solenoid during a traction event. The pneumatic pressure introduced at the control port pressurizes the underside of piston 94 so that movement of the piston from the position shown in FIG. 2 selectively opens the inlet/exhaust valve and varies the portion or ratio of the supply port pressure that reaches the delivery port.

In the arrangement of FIG. 2, a spring 96 urges the piston 94 to the illustrated position and the piston includes a sliding seal such as O-ring 98 for sealing between the control and supply ports. Thus, it will be appreciated that pressure provided through control port 92 must overcome the pressure on the upper side of the piston, as well as the force imposed by the biasing spring 96, to alter the ratio of supply pressure that reaches the delivery port. If the piston is urged upwardly, the amount of the supply pressure provided to the delivery port, and thus the tag axle, is altered.

The arrangement illustrated in FIG. 2 is intended to transfer a predetermined ratio, e.g. approximately fifty percent (50%) of the weight, on the tag axle to the drive axle when a pneumatic signal from the traction control solenoid is received during a traction event. As the weight on the drive axle approaches a predetermined maximum, e.g., twenty thousand pounds (20,000 lbs), the proportional load transfer valve will transfer less than fifty percent (50%) of the weight on the tag axle to the drive axle.

Based upon a predetermined pressure in the drive axle suspension airbags, the valve blend-back pressure determines the point where no additional load is transferred. Thus, the proportional load transfer valve can transfer as little as zero percent (0%) from the tag to the drive axle to prevent overloading of the drive axle. When the control port is vented to atmosphere, however, the proportional load transfer valve delivers one-hundred percent (100%). As indicated in FIG. 3, which is a graphical representation of the supply pressure versus the delivery pressure, a fifty percent (50%) output ratio is delivered.

Moreover, the preferred proportional load transfer valve can transfer some ratio from the tag axle to the drive axle at the lower pressure ranges. This is particularly illustrated in FIG. 3 which demonstrates a proportional transfer at supply pressures at or equal to zero (0) psi.

Figure 3:
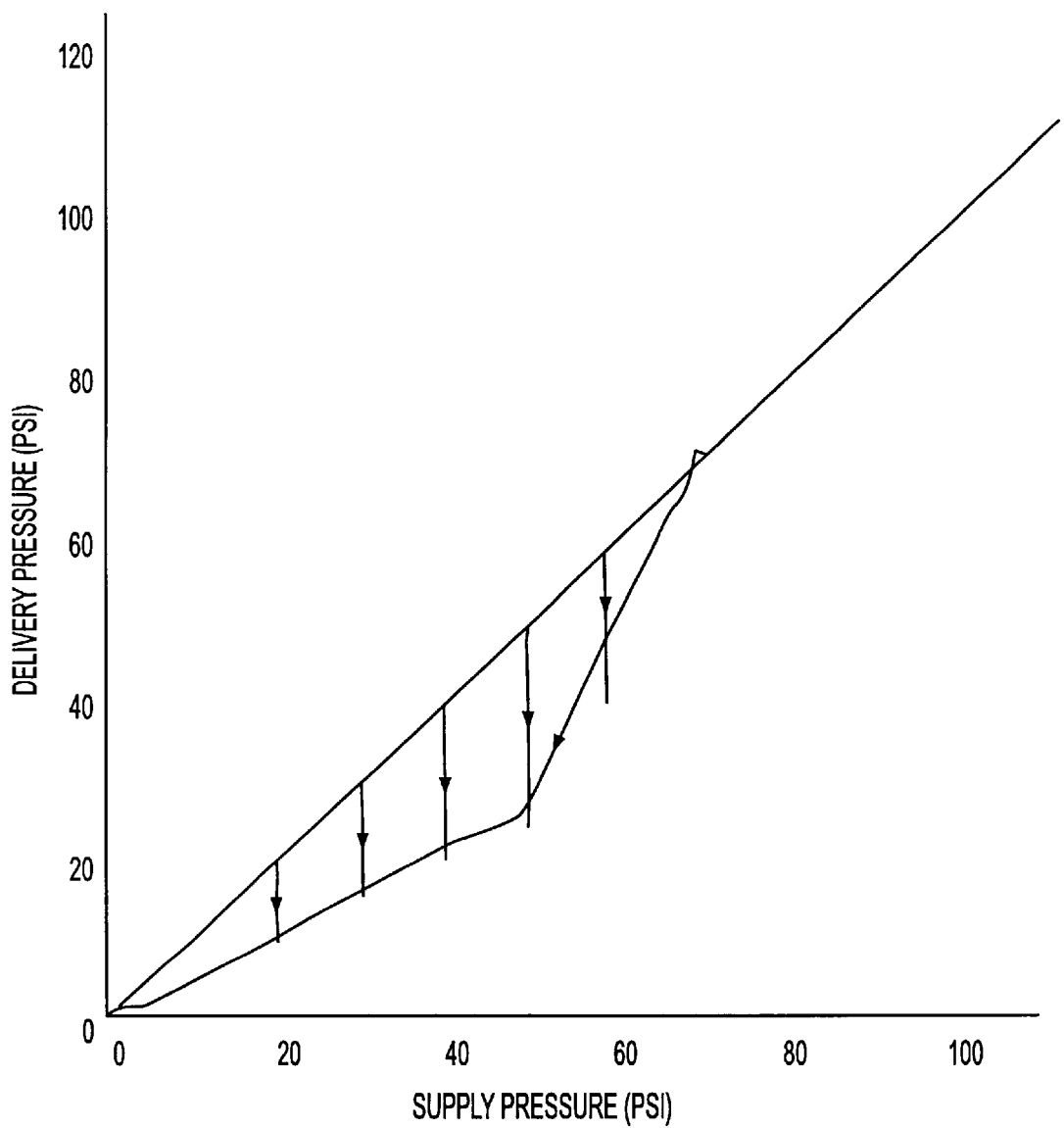
FIG. 3 is a graphical representation of the supply and delivery pressures provided by the valve of FIG. 2.
Figure 4:
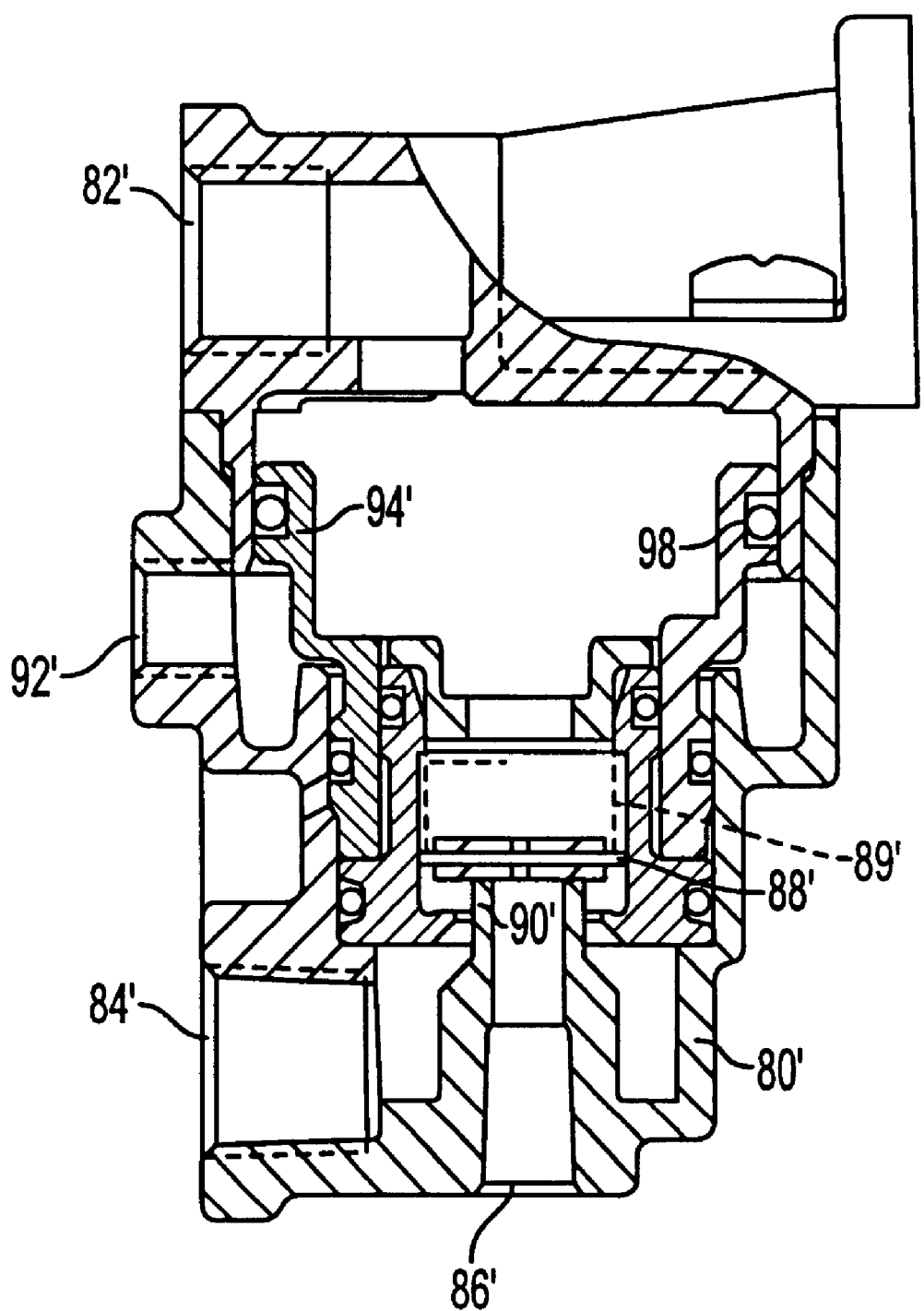
FIG. 4 is a second preferred arrangement of a proportional load transfer valve; and, FIG. 5 is a graphical representation of the supply pressure versus the delivery pressure provided by the valve of FIG. 4.
Figure 5:
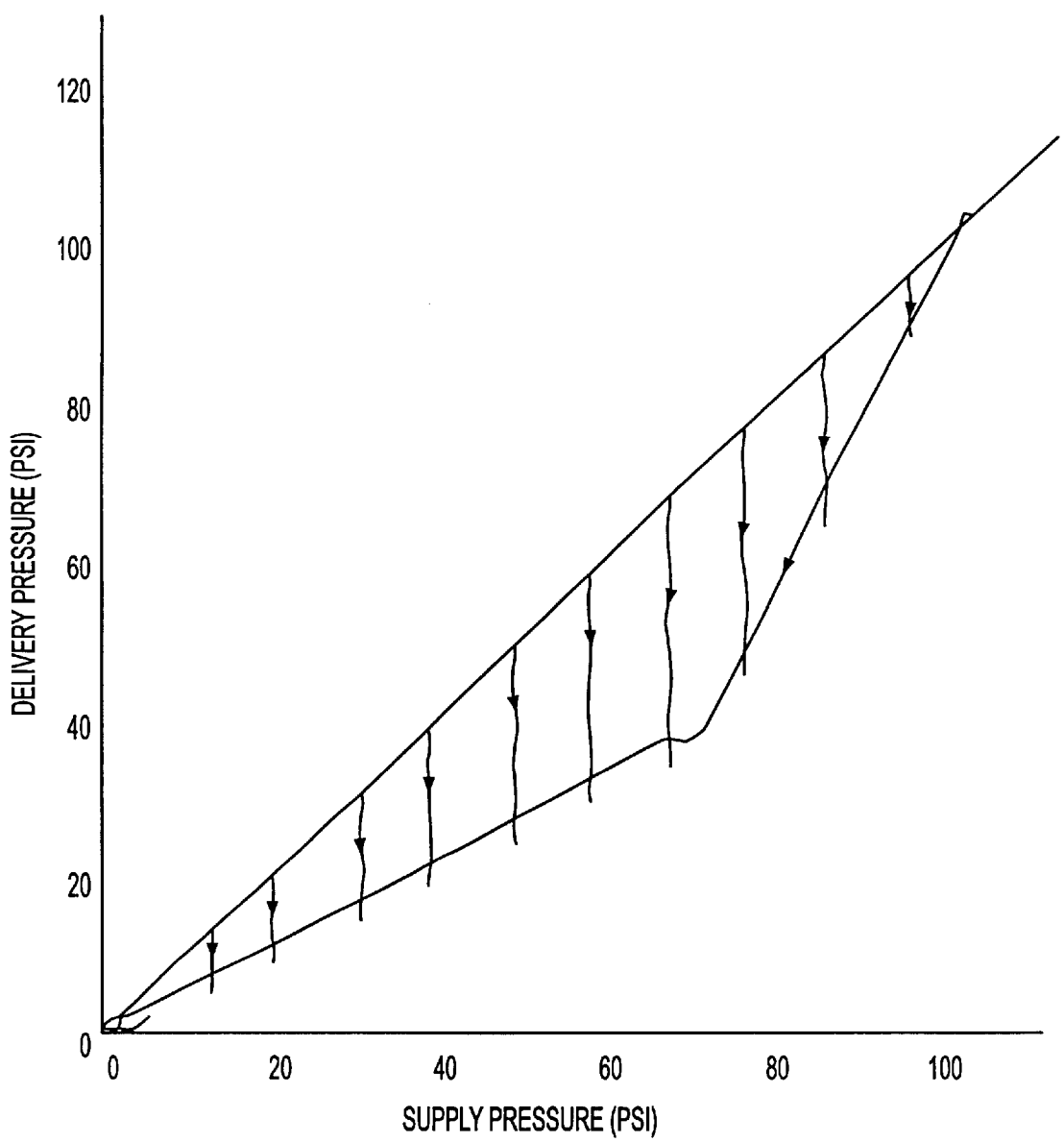

FIGS. 4 and 5 are substantially identical to the embodiment of FIGS. 2 and 3, except that a different setting for the blend-back force is used. In FIG. 4, like elements are identified by like reference numerals with a primed (') suffix, while new components are identified by new numerals. For example, 80' refers to a valve housing, 82' a first or supply port, 84' a second or delivery port, 86' a third or exhaust port, 88' an inlet/exhaust valve, 89' a spring, 90' an exhaust seat, 92' a fourth or control port, and 94' a piston, which are structurally and functionally identical to the components described in connection with the embodiment of FIG. 2 unless specifically noted to the contrary. As will be apparent, spring 96 from the embodiment of FIG. 2 is eliminated. Whereas the embodiment of FIGS. 2 and 3 has a setting of 60 psi, the proportional load transfer valve of FIG. 4 is set at 80 psi. Thus, the curve of FIG. 5 illustrates the operating characteristics of the valve that may be compared to that shown in FIG. 3. It will be appreciated, however, that still other settings can be used to achieve a desired operational curve and that effectively transfer a portion of the weight on the tag axle to the drive axle in response to a pneumatic signal from a traction control event.

It is also important that an upper limit be established so that the drive axle, when it approaches the legal highway weight limit, does not receive any additional load transfer from the tag axle. Thus, as the predetermined pressure in the drive axle suspension airbags is achieved, the valve will transfer zero percent (0%) from the tag axle to the drive axle to prevent overloading. Moreover, it will be appreciated that the valve may adopt other configurations than the particular structural configuration illustrated herein that achieves these objectives.

The invention has been described with reference to the preferred embodiment. obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A proportional load transfer assembly for a vehicle having a traction and suspension control assembly, the proportional load transfer assembly comprising:

a drive axle;

a traction control assembly for the drive axle for selectively controlling torque to a wheel mounted on the drive axle in response to a traction control event;

a non-drive axle;

a suspension assembly for automatically proportioning vehicle load between the drive and non-drive axles in response to a traction control event; and a valve assembly having a valve member interposed between a supply port and a delivery port that is operatively associated with the suspension assembly for selectively transferring a predetermined ratio of vehicle load from the non-drive axle to the drive axle up to a preselected maximum in response to a traction control event, said valve assembly including a moveable member operatively associated with the valve member and including a pressure surface thereon that communicates with a control port in communication with the traction control assembly.

2. The invention of claim 1 wherein the valve assembly includes an exhaust port selectively sealed by the valve member, whereby a ratio of supply pressure provided to the delivery port depends on the position of the valve member relative to the exhaust port.

3. The invention of claim 2 wherein the valve assembly includes a biasing member urging the moveable member toward a first position whereby the valve member closes the exhaust port and all of the supply pressure is provided to the delivery port.

4. The invention of claim 3 wherein the valve assembly further includes a second biasing member urging the valve member toward a valve seat associated with the exhaust port.

5. A proportional load transfer assembly for a vehicle having a traction and suspension control assembly, the proportional load transfer assembly comprising:

a drive axle;

a traction control assembly for the drive axle for selectively controlling torque to a wheel mounted on the drive axle in response to a traction control event;

a non-drive axle;

a suspension assembly for proportioning vehicle load between the drive and non-drive axles in response to a traction control event; and a valve assembly interposed between a supply port and a delivery port operatively associated with the suspension assembly for selectively transferring a predetermined ratio of vehicle load from the non-drive axle to the drive axle up to a preselected maximum, wherein the valve assembly includes a moveable member having a pressure surface thereon that communicates with a control port in communication with the traction control assembly and moves in response to a pressure signal from the traction control assembly.

6. The invention of claim 5 wherein the valve assembly includes a valve member operatively associated with the moveable member, and an exhaust port selectively sealed by the valve member, whereby a ratio of supply pressure provided to the delivery port depends on the position of the valve member relative to the exhaust port.

7. The invention of claim 6 wherein the valve assembly includes a biasing member urging the moveable member toward a first position whereby the valve member closes the exhaust port and all of the supply pressure is provided to the delivery port.

8. The invention of claim 7 wherein the valve assembly further includes a second biasing member urging the valve member toward a valve seat associated with the exhaust port.

* * * * *